United States Patent [19]

Richter et al.

[11] 4,181,287

[45] Jan. 1, 1980

[54] MOLDING APPARATUS FOR RIGID FOAM PIPE INSULATION

[75] Inventors: C. Stephen Richter, Merrimack, N.H.; Russell L. Ault, Newark, Ohio

[73] Assignee: Owens-Corning Fiberglas Corporation, Toledo, Ohio

[21] Appl. No.: 918,997

[22] Filed: Jun. 26, 1978

[51] Int. Cl.$^2$ ............................................. B41D 3/08
[52] U.S. Cl. ..................................... 249/154; 249/144
[58] Field of Search ................................ 249/154, 144

[56] References Cited

U.S. PATENT DOCUMENTS

| | | | |
|---|---|---|---|
| 430,273 | 6/1890 | Dejey | 249/154 |
| 680,273 | 8/1901 | Parker | 249/154 |
| 1,271,849 | 7/1918 | Campbell | 249/154 |
| 1,579,213 | 3/1923 | Dille | 249/154 |
| 2,869,213 | 12/1955 | Longfellow | 249/154 |
| 3,163,687 | 1/1959 | Einhorn | 264/54 |
| 3,275,282 | 9/1966 | Schulz | 249/82 |
| 3,642,398 | 2/1972 | Rudgisch | 249/154 |
| 3,643,911 | 2/1972 | Reid | 249/170 |
| 3,656,730 | 4/1972 | Hogben et al. | 249/134 |
| 3,922,135 | 11/1975 | Haller et al. | 425/432 |
| 3,985,330 | 10/1976 | Dorfman | 249/65 |

*Primary Examiner*—Lester L. Lee
*Attorney, Agent, or Firm*—Ronald C. Hudgens; Philip R. Cloutier; Paul J. Rose

[57] ABSTRACT

Apparatus for molding rigid foam components of semicircular cross section suitable for insulating pipes and the like. A female molding component is formed of sheet metal material supported by a plurality of spaced, rigid crossmembers. This female component supports a top panel, the underside of which, in turn, supports a male mold component the semicylindrical surface of which is formed of sheet metal material which is supported by a plurality of spaced, semicircular rigid support members. When the mold is charged with an expansible foam, the pressure thereof serves to maintain the integrity of the mold profile. The design of the mold permits its fabrication utilizing relatively inexpensive material thus permitting the formation of rigid insulative foam segments at desirable unit cost levels.

15 Claims, 9 Drawing Figures

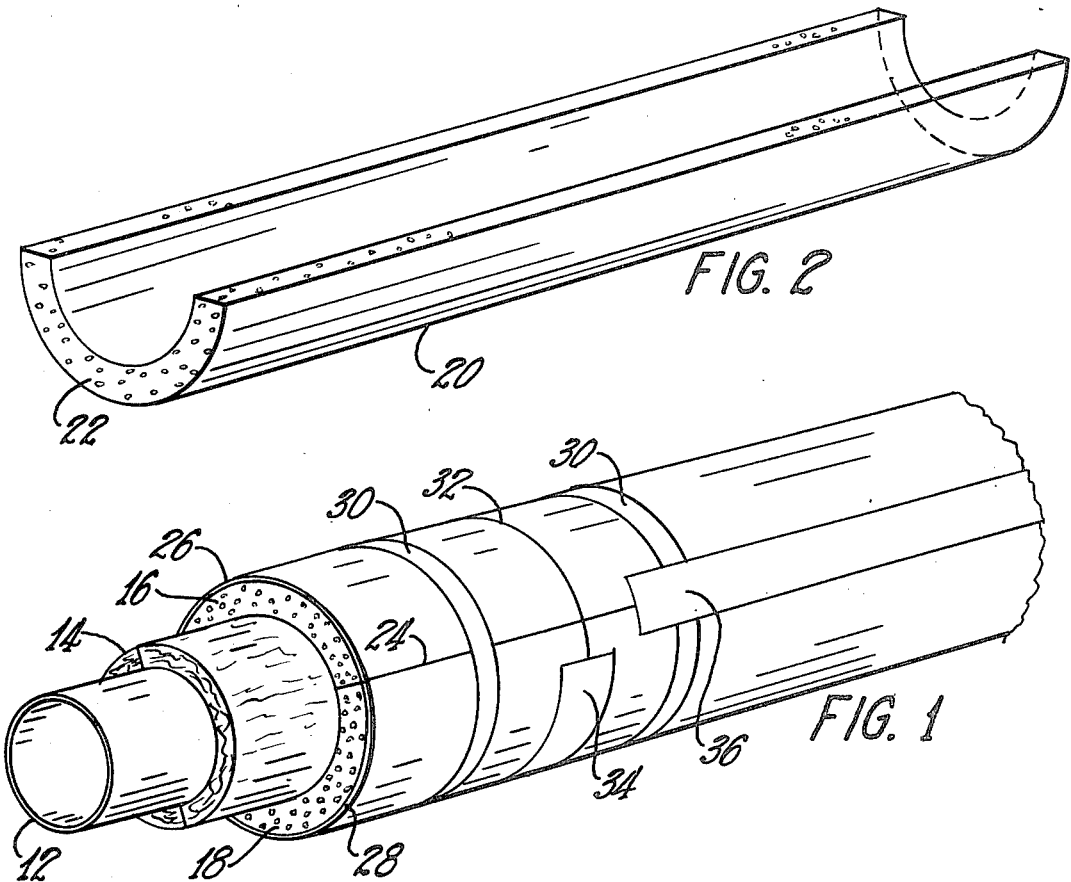
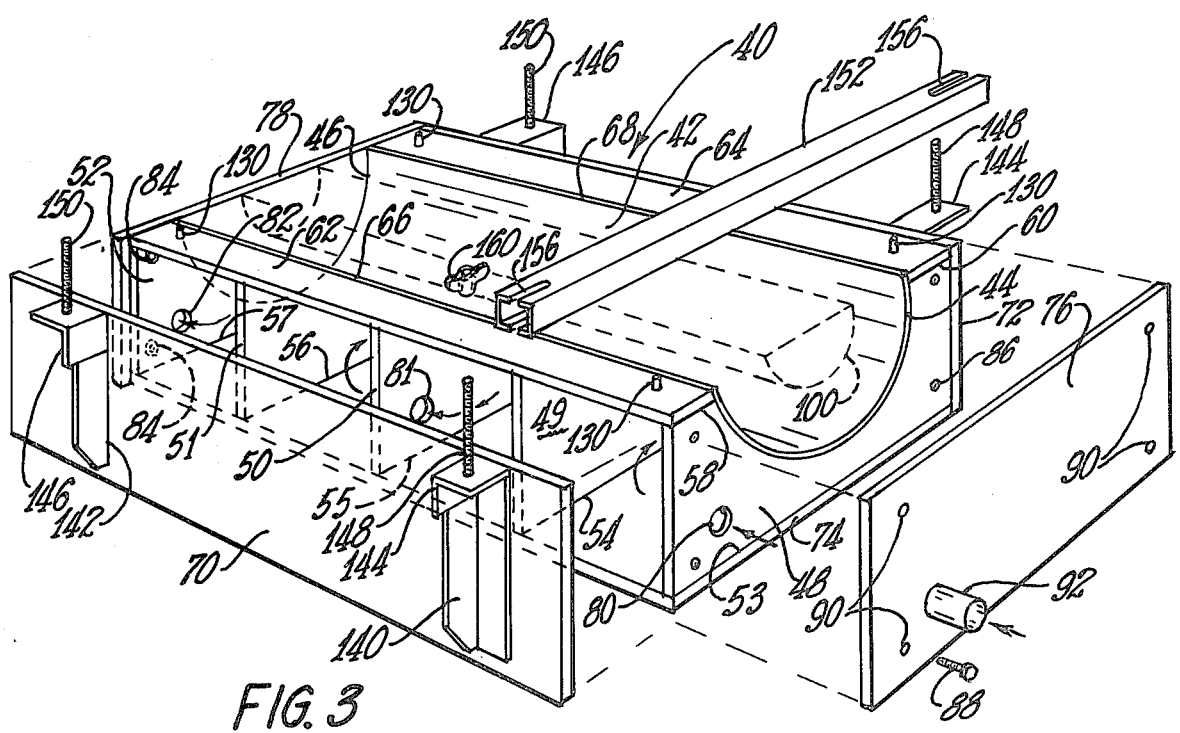

MOLDING APPARATUS FOR RIGID FOAM PIPE INSULATION

BACKGROUND OF THE INVENTION

Current techniques associated with the processing and handling of fluids maintained at cryogenic temperatures involve the movement of such fluids through metal pipes over somewhat extended distances. For example, liquid natural gas is transported by tankers between on-loading and off-loading installations utilizing port facilities having extensive pipeline networks leading from and to storage and processing complexes. For such applications, it is imperative that the cryogenic temperatures of such transported fluids be maintained throughout the residence intervals of the fluids within the pipelines. Generally, the cryogenic temperature integrity of the pipe transport systems is achieved through resort to specific insulation structures, the fabrication and the installation of which are not insignificant in terms of cost.

One such insulating approach finding acceptance on the part of industry provides for the installation of a composite, multiple-layer arrangement of selected insulative materials about each line of pipe, including the elbows, tees and valves conventionally encountered in directional changes, fluid diversion and the like. The composite includes, for example, an initial layer present in a cylindrically shaped mat of glass fiber insulation situated adjacent to and fully surrounding the pipe being treated. This layer provides a cushion effect, reducing stress from expansion and contraction of the entire system. Over this initial layer is positioned a second layer, fabricated of an insulative rigid foam preformed of urethane or the like. The latter generally is selected by virtue of its exceptionally low "k" factor and in view of its desirable compressive strength and consequent durability attributes. Over the above-noted second layer, there is provided a non-porous and continuous layer of a glass fiber reinforced plastic formulated, for example, to provide resistance to degradation due to exposure to ultraviolet radiation. The third layer provides a positive vapor barrier of an abuse-resistant material forming a weather barrier highly immune to corrosion and the sometimes extreme environmental conditions to which pipeline systems are exposed.

The rigid urethane foams utilized for the second layer conventionally are factory produced by extrusion as "bun stock", typically configured as blocks having a peripheral extent of about 4×8 feet and thicknesses ranging from about 2 to 3 feet. These larger blocks then are transported to a forming facility where, typically through the utilization of relatively large band saws, they are shaped as cylinders or semicylinders having dimensions suited to closely nest against the first glass fiber mat layer of the insulating composite. The glass fiber reinforced plastic third layer generally is coated upon the outer surface of the shaped second layer components prior to installation at the using facility. Obviously, the practical length of the second layer cylinders or semicylinders is at least in part limited by sawing or machine forming capabilities, a practical maximum length being about three feet. Molding these semicylinders and cylinders of foam has been dismissed as impractical in the past, inasmuch as the cost of producing molds suited for the various types, shapes and styles of the components has been considered by industry to be prohibitive as compared to the costs of sawing the material to a desired shape.

After the forming of the second layer component of rigid urethane foam as discrete modular components and of the above-discussed glass fiber reinforced plastic layer thereover, all of the components are shipped from the fabricating factory to the site of installation. During installation, the first layer is applied to the pipe being treated following appropriate cleaning procedures, then the second layer is secured over the first, and a glass fiber reinforced resin attachment procedure is carried out to derive a continuous effective coating for the pipes. As is apparent, shipment of the materials to the site of installation involves the movement of very light materials of relatively high bulk, a situation often leading to elevated transportation costs.

SUMMARY

The present invention is addressed to molding apparatus for forming rigid foam segments of generally semi-cylindrical shape suitable for use as insulative coverings for pipes and the like. Highly practical in design, the apparatus can be fabricated and used at cost levels permitting the elimination of the sawing procedures heretofore resorted to in forming such components. Further, the mold apparatus of the invention affords a desirable flexibility in selecting the site of fabrication of the insulative components. By virtue of its low fabrication cost, molding facilities may be provided at locations relatively near to the site of the installation wherein the insulated structures are mounted. As a consequence, shipping costs otherwise associated with the relatively inefficient transportation of bulky material are avoidable.

Another feature and object of the invention is to provide a molding apparatus for producing segments of the type described which incorporates a female mold component having a mold surface formed of relatively thin metal sheet material. This material is supported by the plurality of rigid crossmembers which are spaced in a predetermined alignment along the longitudinal extent of the shaped sheet material. Each of these crossmembers is provided with a concavity shaped in correspondence with the sheet mold surface and provides supportive contact with one side of the sheet material. The apparatus further includes a flat top member which is positionable over the female mold surface. To this top member is attached a male mold component which, as in the case of the female mold component, has a mold surface fashioned of metal sheet material shaped to define substantially semicircular cross sections spaced along the axis thereof. This sheet material is supported by a plurality of spaced, rigid, semicircular support members which are positioned along the lengthwise extent thereof. End panels are positioned at each transversely disposed end of the assembled male-female mold structure, thereby defining a mold cavity. This cavity is chargeable with a predetermined amount of expansible foamaceous material of conventional composition. The material exerts a pressure upon the sheet metal surfaces of the mold component which tend to urge these surfces into their proper contour defining orientations, i.e., the pressure evolved from the foaming material contributes to the profile integrity of the mold apparatus.

Another feature and object of the invention is to provide a molding apparatus of the type described wherein the noted rigid semicircular support members of the male mold component and/or the supporting crossmembers of the female component of the mold have holes therethrough. An access is provided to the regions defined by these members and their cooperating metal surface coverings for the purpose of introducing warm air thereinto. As a consequence, optimized temperatures for carrying out molding are made available and a flexibility in choosing a site for carrying out molding operations with the apparatus is further enhanced.

As another object of the invention, molding apparatus is provided as described above, but the metal sheet material forming the male and female component mold surfaces is segmented, for instance in trapezoidal fashion, to permit the fabrication of rigid insulative components suited for covering elbows or curves as are typically encountered in pipeline systems.

In consequence of the particular design of the mold apparatus of the ivention, relatively inexpensive material may be utilized in its fabrication. For example, the crossmembers provided in support of the female mold component as well as the rigid support members provided in support of the male mold component may be formed of a wood product such as fiberboard or plywood. The metal surfaces utilized in covering these members may be formed of a relatively thin sheet material such as aluminum having a thickness of about one-eighth inch, stainless steel, or the like, which is preformed into semicylindrical or other suitable shapes using conventional roll forming procedures. The metal sheets may be attached to the crossmembers and supports by simple connectors such as nails or the like, inasmuch as the relatively low pressures asserted by the expansible foamaceous material serves to assure the integrity of the profile defined by the mold surfaces.

Other objects of the invention will, in part, be obvious and will, in part, appear hereinafter.

The invention, accordingly, comprises the apparatus possessing the construction, combination of elements and arrangement of parts which are exemplified by the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a perspective view of a cryogenic pipeline segment having an insulative arrangement incorporating components fabricated in accordance with the invention;

FIG. 2 is a perspective view of a semicylindrical rigid foam segment which may be formed in accordance with the invention;

FIG. 3 is an exploded representation of a female mold component provided according to the invention;

DETAILED DISCLOSURE

Figure 4:
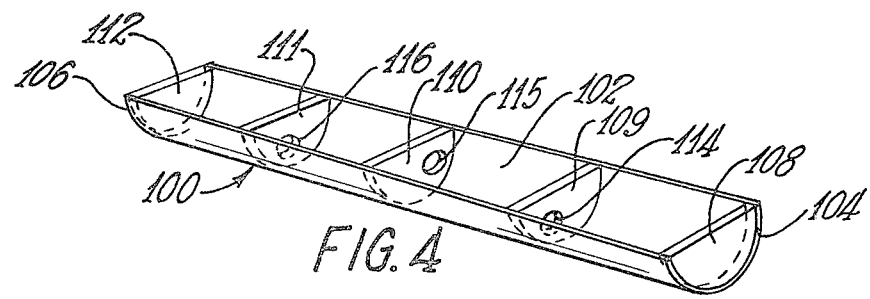
FIG. 4 is a perspective representation of a male mold component formed according to the invention.

Looking to FIG. 1, an assembly which may be considered representative of those utilized with insulating pipelines through which cryogenic fluids are transported is revealed generally at 10. A portion of cryogenic fluid transporting pipe is represented at 12 which is insulatively protected by a composite structure of two insulative layers and an externally exposed vapor barrier. These components are installed upon the pipe 12 at its location in the field. Generally, the innermost layer, as at 14 is formed of heavy density glass fiber insulation which is characterised in being dimensionally stable and in exhibiting a resiliency such that it can absorb stress which occur when the pipeline expands or contracts in response to alterations in service operating temperatures. Insulative layer 14 usually is provided as an assemblage of two semicylindrical, partially joined segments which are positioned over pipe 14 as shown and then taped together. Expansion permitting butt jointing of longitudinally aligned sections of the segments generally is provided. After the installation of insulation layer 14, a layer of rigid urethane foam is provided. In the embodiment represented at 10, this urethane foam layer is provided as two semicylindrical segments 16 and 18.

Looking momentarily to FIG. 2, a semicylindrical segment of this rigid urethane foam is revealed at 20. Prior to the evolution of the instant invention, the common industrial practice was to form the segments 20 from large blocks of cured urethane foam by resorting to sawing practices and the like. Thus formed, the practical length of the segments 20 is about three feet and each segment terminates in a flat surface 22 sawed perpendicular to the lengthwise axis thereof.

Returning to FIG. 1, segments 16 and 18 are positioned over layer 14 such that longitudinally disposed joints 24 are positioned in offset relationship or remotely from the corresponding joints formed within insulation layer 14. The outwardly disposed surface of each of the rigid foam segments 16 and 18 is coated with a third layer present as a thin outer jacket of glass fiber reinforced plastic. Serving to protect the composite against degradation due to moisture penetration and vapor barrier damage due to impact, weathering and other forms of abuse, the jackets as at 26 or 28 have in the past been formed over the rigid foam components 20 following the shaping thereof by sawing.

The rigid foam segments 16 and 18 with jackets 26 and 28 are assembled in the field by positioning them in the manner shown in FIG. 1 and forming a closely nesting fit over insulation 14 through the use of ratchet straps or the like, as represented at 30. After the jacketed segments are so positioned, the end joints as at 32, as well as longitudinal joints 24, are coupled by a "field welding" procedure wherein strips of glass fiber reinforcing mat impregnated with resin, as are revealed at 34 and 36, are placed over the joints and permitted to cure. Generally, a dual layering of the mats 34 and 35 is utilized to improve the integrity of the joint bond. Following a relatively short interval for curing of the resin the ratchet straps 30 are removed to complete the installation.

The present invention looks to a highly practical molding apparatus for nproducing segments 20 by molding, as opposed to a molding step followed by cutting or forming steps and, additionally, provides a facility wherein the outer jackets as described at 26 and 28 may be integrally molded with segments 20. This apparatus may be provided both for forming right semi-cylindrical rigid foam segments as at 20 or for forming semicylindrical curved components for insulatively covering elbows and similarly curved pipe sections. Looking to FIG. 3, an exploded perspective representation of a preferred female mold component of this apparatus is revealed generally at 40. Mold component 40 has a concavely oriented female mold surface provided by a unitary piece of metal sheet material 42. This material may, for example, be sheet aluminum having a thickness of about one-eighth inch or stainless steel of thickness providing an equivalent strength. The sheet 42 is prerolled utilizing conventional sheet metal forming machinery to define a semicircular right cross section and is provided having a length extending between endwise edges 44 and 46. Sheet 42 is supported by a plurality of rigid crossmembers 48-52, which may be formed of a wood material, for example fiberboard or plywood. Each of the crossmembers 48-52 has a generally rectangular periphery and is provided with a concavity shaped in correspondence with the downwardly disposed convex surface defined by sheet 42. Further, the crossmembers 48-52 have flat base edges spaced from the lowermost level of the concavities, as shown respectively at 53-57. Additionally, the crossmembers have uppermost edges which extend outwardly from their juncture with sheet 42 in a plane parallel with base edges 53-57. For example, the uppermost outwardly extending edges of crossmember 48 are revealed at 58 and 60. These outermost edges serve to support elongate support platforms 62 and 64. Formed of the same panel-type material as crossmembers 48-52, the upwardly disposed surfaces of platforms 62 and 64 are parallel with base edges 53-57 and are coincident with the respective oppositely disposed elongate edges 66 and 68 of metal sheet 42. Note also that the outwardly disposed edges of platforms 62 and 64 are aligned with the outer, upstanding edges of crossmembers 48-52. In addition to providing a support and alignment function as described later herein, platforms 62 and 64 serve as an initial aid in the fabrication of component 40 by providing an initial support for crossmembers 48-52 prior to the attachment of metal sheet 42 to the concavities thereof. In this regard, attachment of metal sheet 42 may be accomplished by hammering roofing tacks therethrough into the crossmembers. Note that an air space or region is defined beneath platforms 62 and 54 and metal sheet 42. This region is further enclosed by elongate rectangular side panels 70 and 72, a rectangular bottom panel 74, and the outwardly disposed crossmembers 48 and 52. The above-listed panel components may be formed of fiberboard or plywood similarly to the crossmembers 48-52 and construction of the assembly thus far described may utilize typical nailing procedures for assembly purposes. The region thus enclosed is provided with access for the purpose of introducing warm air thereinto by a series of apertures or openings formed within each of the crossmembers 48-52, three of which are revealed at 80-82 extending through respective crossmembers 48, 50, and 52. To expand the residence interval of this air flow within the noted region, the openings within the crossmembers are staggered, i.e. located at alternating opposite sides of component 40, to produce a baffling effect.

As will become more apparent as the discussion unfolds, the mold cavity itself is secured, for example, along the endwise edges 46 and 44 of sheet 42 by end panels 76 and 78. These panels are attached to the respective outermost cross members 48 and 52 through utlization of conventional connectors, for example T-nuts 84 extending through holes 86 and threadably engaged with machine bolts as at 88 extending through associated holes 90. End panel 76 has a sheet metal cylinder 92 fixed thereto, for example, by an adhesive. The cylinder 92 communicates with opening 80 in crossmember 48 when the end panel is installed thereagainst. With the arrangement shown, warm air introduced through cylinder 92 flows over a given residence interval through the enclosed region, whereupon it exits through opening 82 of crossmember 52 and an opening (not shown) in end panel 78 aligned therewith. It may be noted that the outwardly disposed surfaces of crossmembers 48 and 52 are aligned with the ends of elongate support platforms 62 and 64 as well as with the respective endwise edges 44 and 46 of metal sheet 42. Accordingly, as is revealed in more detail hereinbelow, these panels 76 and 78 serve to enclose the endwise surfaces of the mold cavity.

Looking now to FIG. 4, the male mold component of the apparatus of the invention is revealed generally at 100. Component 100 comprises a convexly oriented male mold surface formed of metal sheet material 102 preformed to define a semicircular right cross section and having a length extending between endwise edges and corresponding with the length of metal sheet 42 forming the surface of the female mold component 40. Sheet 102 is preformed to define a semicylindrical surface by conventional metal forming techniques and is supported by a plurality of spaced, rigid support members 108-112. Members 108-112 have identical dimensions, have flat base edges, and may be fashioned of plywood or fiberboard, thus permitting their low cost fabrication. The sheet material 104 may be attached to the support members by roofing tacks or the like, and the internal region of the mold is configured to permit the baffled flow of air therethrough by virtue of apertures or openings 114-116 formed within the respectively internally disposed support members 109-111. Note as before that these openings are staggered to lengthen the residence interval of warm air passing through the enclosed region of the mold. The type of sheet metal material 102 utilized may be identical to that shown at 42, i.e. being formed of aluminum having a thickness of about one eighth inch or of stainless steel with an equivalent strength.

Figure 5:
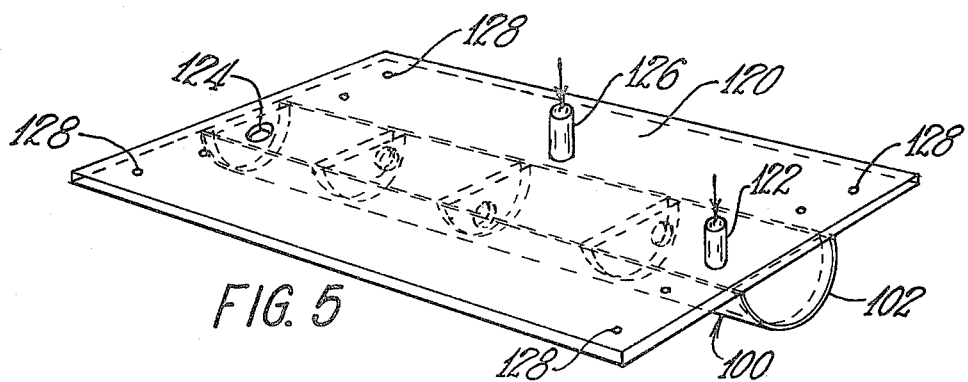
FIG. 5 is a perspective representation of a top panel suited for use with the mold component of FIG. 3 and supporting the male component of FIG. 4.

Turning to FIG. 5, a top panel 120 having a rectangular configuration corresponding with the top profile of female mold component 40 is revealed. Formed of wood material paneling or the like, panel 120 exhibits a flat lower disposed surface which serves to retain and properly position male mold component 100 so as to define the desired semi-cylindrical mold cavity when panel 120 is positioned over female mold component 40. The support members 108-112 are secured to the top panel 120 in any suitable manner, such as by screws, nails, or adhesive. Access through panel 120 into the region defined by metal sheet 102 and support members 108-112 is provided by an opening formed therein within which is inserted a metal inlet cylinder 122. As before, warm air may be introduced through inlet 122 to pass along a baffled path within the enclosed region of male component 100 to exit from a remotely disposed opening 124. An additional metal cylindrical inlet 126 is mounted for access through panel 120 at a location adjacent the connection of male mold component 100 thereto. Relatively centrally located on the panel 120, inlet 126 serves as the inlet for charging the mold cavity defined by the apparatus at such time as the panel 120 is properly positioned upon female mold component 40. Proper positioning of the top panel 120 and component 100 is facilitated through the utilization of a locator arrangement. This arrangement includes locating grommets 128 mounted within top panel 120 and corresponding located pins 130 mounted on elongate support platforms 62 and 64. The pins 130 extend perpendicularly from the upwardly disposed surfaces of the support platforms and are so located that, when inserted within corresponding grommets 128, top panel 20 will be aligned so as to properly position male mold component 100 over the metal surface 42 of female component 40. This positioning is revealed in phantom in FIG. 3.

Figure 6:
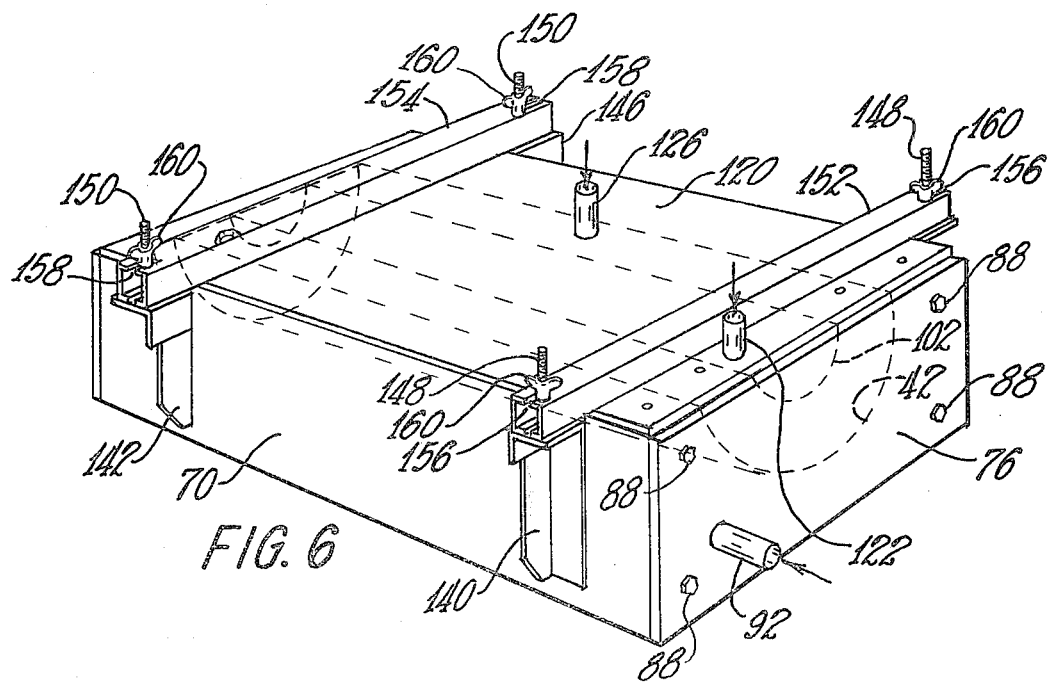
FIG. 6 is a perspective representation of the mold components of the invention as assembled for carrying out a molding procedure.

When top panel 120 is positioned over the female mold component 40 as described, it is secured against the pressures exerted by the expansible foamaceous charging material through a structural arrangement revealed in FIGS. 3 and 6. Looking to those figures, it may be observed that each of the side panels 70 and 72 has two restraining brakets secured thereto in any suitable manner and shown generally at 140 and 142. These brackets are formed of angle stock extending upwardly along the outwardly disposed surfaces of side panels 70 and 72. Each of the restraining brackets includes opposed outwardly disposed stud supporting portions shown respectively at 144 and 146. The upwardly disposed surfaces of portions 144 support and are weldably coupled to upstanding threaded studs 148, while the corresponding upwardly disposed surfaces of portion 146 support threaded studs 150.

Top panel 120 is retained in position by two hold-down bars 152 and 154 which, respectively, are provided with slots 156 and 158 extending inwardly from the ends thereof. When bars 152 and 154 are positioned over top panel 120, their respective slots 156 and 158 slide over respective studs 148 and 150. Thereafter wing nuts 160 are threadably engaged with studs 148 and 150 and tightened down upon associated hold-down bars 152 and 154. When desired, warm air is introduced through inlet cylinders 92 and 122, the simple expedient of utilizing a conventional hair dryer as the source of this warm air being an acceptable one. As the mold reaches an appropriate temperature for the charging of the foamaceous material, the mold is charged through inlet 126 and the foaming material is allowed to expand and cure. Generally, the mold material is provided as a simultaneously introduced polyol, catalyst and foam agent, a wide variety of materials being available in the art. The amount of the charge is predetermined such that the mold is not overcharged, but pressure exerted by the mold material tends to urge the opposed metal sheet members 42 and 102 into close adjacency with corresponding respective supporting crossmembers 48-52 and rigid support members 108-112. With this arrangement, the expansion of the foamaceous material itself serves to assure the integrity of the profile defined by the mold cavity surface components. Such a design allows the fabrication of the mold apparatus utilizing relatively inexpensive materials, thus permitting the elimination of sawing and similar forming procedures to derive desired rigid foam shapes.

As an alternative arrangement, the female mold surface defined by sheet material 42 initially may be covered with a glass fiber reinforcing mat and resin to provide an outer jacket as described earlier at 26 and 28 in conjunction with FIG. 1. Following treatment of the surface of sheet 42 with a mold release agent, the mat material and resin is positioned as above and the mold is closed and charged with expansible material through inlet 126. The resultant semicylindrical composite is produced without resort to an additional fabrication step.

The molding arrangement of the invention has another advantage inasmuch as shiplap joints are easily formed by providing appropriate rectangular collars along the endwise edges of appropriate male and female mold components. For example, such collars may be positioned along edges 44 or 46 within mold component 40 or along the outward extent of endwise edges 104 or 106 of male mold components 100. Generally, pieces of pipe insulation with shiplap joints have been unavailable to the industry, inasmuch as forming them has required added and relatively costly machining steps.

Figure 7:
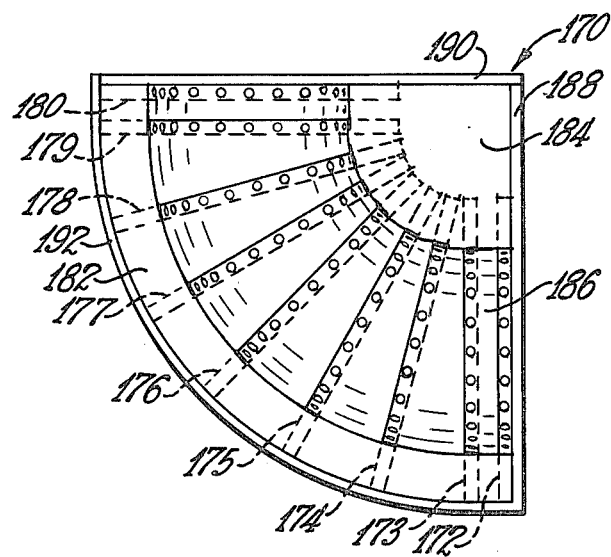
FIG. 7 is a top view of a female mold component according to the invention utilized in forming foam structures for 90° pipe elbows.

Referring to FIG. 7, an adaptation of the above-described mold structure to utilization in forming semi-cylindrical, but curved insulated segments is revealed. A female component for such a mold utilized in providing an insulated segment for a 90° ell is shown generally at 170. This component is fashioned in the general manner described hereinabove including the provision of rigid panel cross members 172-180 which are arranged perpendicularly to the centrally disposed axis of the mold cavity, each of members 173-179 being positioned along a radius of the center curvature of the ell. The crossmembers are fabricated substantially identically to crossmembers 108-112 described above, each incorporating a concavity of semicircular profile, a flat base portion and outwardly extending uppermost edges. Over the radially outwardly disposed ones of the latter edges is attached an arcuately configured elongate support platform 182. Along the oppositely extending uppermost edges is attached a corresponding inwardly disposed support platform 184, the upward surface of which lies in parallel relationship with the corresponding upward surface of support platform 182. A multi-segmented sheet metal material surface 186 is attached over the concavities of crossmembers 172-180, the multi-segmented structure being necessitated by the curvature of the mold. End panels 188 and 190 are shown attached to the respective outwardly disposed crossmembers 172 and 180 of the mold, while an arcuate outer support panel 192 serves as a partial enclosure along with a bottom panel (not shown). As before, staggered openings are provided in each of the crossmembers 172-180 as well as in end panels 188 and 190 to permit the passage of warm air therethrough.

Figure 8:
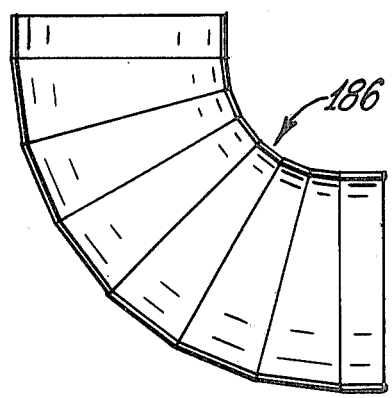
FIG. 8 is a top view of the sheet metal component utilized in forming the mold of FIG. 7.

Looking to FIG. 8, the general structure of sheet metal surface 186 is revealed, each of the segments attached to the concavities of crossmembers 172-180 with the exception of the outwardly disposed ones thereof being shaped in progressively varying trapezoidal patterns which individually are nailed into position.

Figure 9:
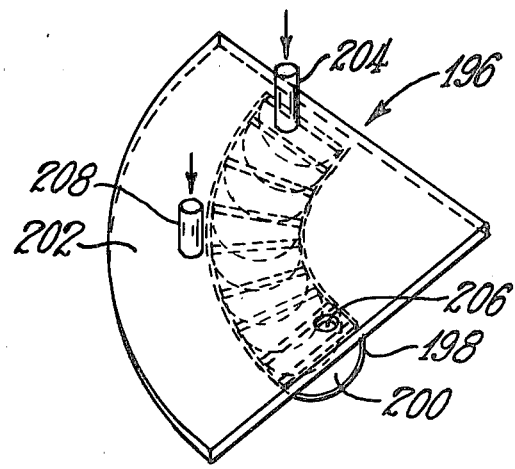
FIG. 9 is a perspective view of a top panel and male mold component utilized in association with the female mold component of FIG. 7.

The male component complementary to female component 170 is formed in substantially the same arcuate fashion utilizing trapezoidal segments. In this regard, reference is made to FIG. 9 wherein the male mold component is represented in perspective at 196. The elbow shaped member is formed of trapezoidal segments of sheet metal material, as represented at 198.

This material is supported by a plurality of semicircular rigid support members, an outermost one of which is represented at 200. As in the earlier embodiment, the rigid support members as at 200 are coupled to the flat bottom surface of a top panel 202 and those support members disposed intermediate the outermost ones thereof as at 200 are provided respectively with staggered openings therein, as in the earlier embodiment, to permit the passage of warm air within the enclosed region of the mold component. In the latter regard, a cylinder 204 is formed within an opening in top panel 202 to provide warm air input to the internal region of the mold, while a remotely disposed outlet opening 206 is provided to permit egress of the air. Additionally, top panel 202 incorporates a cylindrical inlet 208 suitable for introducing a foamaceous charge into the mold. The charging and hold down procedures for this embodiment are the same as described in connection with the embodiment of FIGS. 3 and 6.

Since certain changes may be made in the above apparatus without departing from the scope of the invention herein involved, it is intended that all matters contained in the above description or shown in the accompanying drawings shall be interpreted as illustrative and not in a limiting sense.

What is claimed is:

1. Molding apparatus for forming rigid foam components suited for insulatively covering pipes and the like, comprising:
    a female mold component including a concavely oriented female mold surface formed of metal sheet material, having a length defined by first and second spaced endwise edges, and shaped to define a substantially semicircular cross section extending between oppositely disposed elongate edges, a plurality of rigid crossmembers spaced in predetermined alignment along the lengthwise extent of the convex side of said mold surface, each having a concavity shaped in correspondence with said mold surface for providing spaced supportive contact with the underside thereof extending from the vicinity of one said elongate edge to the other and each having a base edge spaced from the lowermost level of said concavity and a pair of oppositely disposed uppermost edges extending outwardly respectively from the juncture thereof with said metal sheet material in the vicinity of said elongate edges, and connecting means attaching said metal sheet material in mutually supporting relationship with said crossmembers along the said concavities thereof;
    a top member removably positionable over said female mold component, supportable from said crossmembers, and having a lower disposed flat surface substantially continuously engageable with each said metal sheet material elongate edge when positioned over said female mold component to effect the closure of the upwardly facing portions thereof;
    a male mold component including a convexly oriented male mold surface formed of metal sheet material, having a length defined by first and second endwise edges and corresponding with the length of said female mold component, and having a substantially semicircular cross section extending between oppositely disposed elongate edges, a plurality of rigid support members each having a semicircularly shaped periphery, the support members being positioned transversely to and spaced along the lengthwise extent of the concave side of said male mold surface, each having a base portion connected with the lower flat surface of said top member in a manner wherein said elongate edges are in substantially continuous adjacency therewith, and connecting means attaching said metal sheet material in mutually supporting relationship with said crossmembers along the circular peripheral portions thereof;
    first and second end panels each having a flat inwardly disposed surface mountable against respective said first and second spaced endwise edges of said female and male mold components when said top member is positioned over said female mold component, thereby defining a mold cavity; and
    an access opening for charging said mold cavity with an expansible material.

2. The molding apparatus of claim 1 in which:
    selected rigid support members of said male mold component have openings formed therein for circulating warm air therethrough, and access means is provided for introducing warm air into the enclosed region defined by said male mold surface sheet material, said rigid support members and said top member.

3. The molding apparatus of claim 1 in which said openings within adjacently disposed ones of said rigid support members are mutually laterally displaced for extending the residence interval of said warm air within said enclosed region.

4. The molding apparatus of claim 1 in which:
    said female mold component includes side panels connected to said crossmembers and extending along said component length and at least between said base edge and said uppermost edges, and a bottom panel positioned in adjacency with said base edges and extending along said component length;
    said rigid crossmembers have openings formed threin for circulating warm air therethrough; and
    access means is provided for introducing warm air into the enclosed region defined by said female mold surface sheet material, said side panels, said first and second end panels and said bottom panel.

5. The molding apparatus of claim 4 in which said openings within adjacently disposed ones of said crossmembers are mutually laterally displaced for extending the residence interval of said warm air within said enclosed region.

6. The molding apparatus of claim 1 in which the outwardly disposed ones of said rigid crossmembers are situated having their outwardly disposed surfaces in alignment and coincident with a said metal sheet endwise edge adjacent thereto.

7. The molding apparatus of claim 1 in which:
    said female and male mold components are configured for forming rigid foam components shaped for covering curved pipe; and
    said male and female metal sheet material comprises a plurality of trapezoidal sheet metal segments positioned in adjacency to define a longitudinally curved mold surface.

8. The molding apparatus of claim 1 in which:
    said female mold component includes side panels connected to said crossmembers, extending along said component length and substantially between said base edge and said uppermost edges, and a bottom panel positioned in adjacency with said base edges and extending along said component length; and clamping means is provided for retaining said top member and attached male mold component in position against said female mold component when said mold cavity is charged with said expansible material.

9. The molding apparatus of claim 1 in which said crossmembers, said top member, said support members, and said first and second end panels are formed of wood panel material.

10. The molding apparatus of claim 1 in which said metal sheet material is aluminum having a thickness of about ⅛ inch.

11. The molding apparatus of claim 1 in which:

each said female mold component crossmember is present as a rectangular wood material panel having said concavity extending inwardly from one side thereof; and each said male mold component rigid support member is present as a wood material panel having a semicircular periphery.

12. The molding apparatus of claim 1 in which:

each said female mold component crossmember is present as a rectangular wood material panel having said concavity extending respectively from the inwardly disposed ends of said uppermost edges;

first and second elongate support platforms are provided, the platforms being coupled to and having a width coextensive with said uppermost edges and having a length coextensive with the length of said female mold component; and said metal sheet material female mold surface extends to the upper surfaces of said first and second support platforms.

13. The molding apparatus of claim 12 in which:

said male mold component rigid support members have openings formed therein for circulating warm air therethrough, and access means is provided for introducing warm air into the enclosed region defined by said male mold surface sheet material, said rigid support members and said top member.

14. The molding apparatus of claim 13 in which said openings within adjacently disposed ones of said rigid support members are mutually laterally displaced for extending the residence interval of said warm air within said closed region.

15. The molding apparatus of claim 13 in which:

said female mold component includes side panels connected to said crossmembers, extending along said component length and substantially between said base edge and the upwardly disposed surfaces of said first and second elongate support platforms, and a bottom panel positioned in adjacency with said base edges and extending along said component length;

select said rigid crossmembers have openings formed therein for circulating warm air therethrough; and access means is provided for introducing warm air into the enclosed region defined by said female mold surface sheet material, said side panels, said first and second end panels and said bottom panel.

* * * * *